(12) United States Patent
Huang

(10) Patent No.: US 8,196,802 B2
(45) Date of Patent: Jun. 12, 2012

(54) SEAL DEVICE AND METHOD FOR ASSEMBLING A GUIDE BLOCK IN A GLAND OF THE SEAL DEVICE

(75) Inventor: Yi-Chieh Huang, Kaohsiung (TW)

(73) Assignee: Scenic Precise Element Inc., Kaohsiung (TW)

( * ) Notice: Subject to any disclaimer, the term of this patent is extended or adjusted under 35 U.S.C. 154(b) by 338 days.

(21) Appl. No.: 12/649,483

(22) Filed: Dec. 30, 2009

(65) Prior Publication Data

US 2010/0264602 A1 Oct. 21, 2010

(51) Int. Cl.
*B23K 9/00* (2006.01)
(52) U.S. Cl. ............... 228/135; 228/141.1; 228/256; 277/520
(58) Field of Classification Search .......... 228/135, 228/141.1, 256; 277/520
See application file for complete search history.

(56) References Cited

U.S. PATENT DOCUMENTS 6,231,048 B1 * 5/2001 McAnally, Jr. ............... 277/520
* cited by examiner

*Primary Examiner* — Kiley Stoner
*Assistant Examiner* — Erin Saad
(74) *Attorney, Agent, or Firm* — Pearl Cohen Zedek Latzer, LLP

(57) ABSTRACT

A seal device for a rotary shaft includes a sleeve, a gland, a ring, a guide block, and a fixing member. The guide block has an outer block surface extending circumferentially and abutting against a portion of an inner gland surface of the gland, and an inner block surface extending circumferentially and opposite to the outer block surface. The outer block surface has two circumferentially opposite outer ends. The inner block surface has two circumferentially opposite inner ends. The guide block further has two opposite end faces each of which connects one of the outer ends to one of the inner ends. The inner ends subtend an angle of not larger than 90° at a center line of the gland. At least one of the end faces lies in a plane line that is substantially tangent to an outer peripheral face of the ring.

9 Claims, 11 Drawing Sheets

SEAL DEVICE AND METHOD FOR ASSEMBLING A GUIDE BLOCK IN A GLAND OF THE SEAL DEVICE

BACKGROUND OF THE INVENTION

1. Field of the Invention

The invention relates to a seal device, more particularly to a seal device mounted between a rotary shaft and a stuffing box of a mixing machine. The invention also relates to a method for assembling a guide block in a gland of the seal device.

2. Description of the Related Art

A seal device is usually mounted in a stuffing box of a mixing machine so as to prevent leakage of fluid stirred in a stirring tank of the mixing machine due to high pressure in the stirring tank.

The seal device is usually classified into a single seal device and a dual seal device. No matter whether the seal device is single or dual, a gland of the seal device is provided with a fluid passage for permitting buffer/barrier fluid or flush fluid to flow therethrough. A guide member is provided in the fluid passage and is inclined so as to guide the fluid to flow smoothly in the fluid passage.

Referring to FIG. 1, a conventional seal device includes a gland 11 formed with an inlet 111 and an outlet 112 aligned with each other, and a guide member 12 annularly extending between the inlet 111 and the outlet 112 within a fluid passage 113. Since the guide member 12 occupies almost half of the fluid passage 113, the heat produced during operation cannot be removed effectively.

Referring to FIG. 2, another conventional seal device includes a gland 21 formed with an inlet 211 and an outlet 212, and a guide member 22 disposed between the inlet 211 and the outlet 212 within a fluid passage 213. The guide member 22 has a middle portion 221 connected to an inner peripheral surface of the gland 21, and two curved guiding portions 222 oppositely extending from the middle portion 221 so as to guide buffer/barrier fluid entering from the inlet 211 to flow through the fluid passage 213 and to exit from the outlet 212. However, turbulence and/or heat aggregation may occur in an area between the guiding portions 222, which in turn causes the guide member 22 to deform, especially when an external pressure is applied into the fluid passage 213.

Referring to FIG. 3, still another seal device disclosed in Taiwanese Utility Model No. M179519 includes a gland 32 formed with a positioning hole 322 communicated with a fluid passage 321, a guide block 31 disposed within the fluid passage 321, and a fixing member 33 inserted into the positioning hole 322 and engaging the guide block 31. The guide block 31 has two oppositely inclined end faces 312, and an inner curved surface 311 extending between the inclined end faces 312 so that the buffer/barrier fluid entering from two inlets 323 can be guided by the inclined end faces 312 of the guide block 31 so as to flow through the fluid passage 321 and exit from an outlet 325 to remove the heat produced due to the rotation of a rotary shaft 36.

Since the plane lines (S1) in which the inclined end faces 312 lie are not tangent to an outer peripheral face of a sleeve 35, the buffer/barrier fluid entering from the inlets 323 is sprayed onto an inner peripheral surface of the gland 32 prior to flowing smoothly in the fluid passage 321. In other words, the buffer/barrier fluid can not be effectively guided by the guide block 31 to flow smoothly in the fluid passage 321. Furthermore, since the fixing member 33 engages the guide block 31 merely at an end portion thereof, it can not be firmly positioned and engaged to the guide block 31. Therefore, the guide block 31 is liable to shake or the fixing member 33 is liable to break during operation of the rotary shaft 36, which in turn causes leakage of the buffer/barrier fluid.

SUMMARY OF THE INVENTION

Therefore, an object of the present invention is to provide a seal device that can overcome at least one of the aforementioned shortcomings of the prior art. Another object of the present invention is to provide a method for assembling a guide block in a gland of the seal device.

In a first aspect of this invention, a seal device for a rotary shaft includes a sleeve, at least one gland, at least one ring, a guide block, and a fixing member. The sleeve is for extension of and connection with the rotary shaft. The gland has an inner gland surface defining a central hole for extension of the sleeve, and a fluid passage extending annularly around the central hole. The ring is disposed around the sleeve within the central hole. The guide block is disposed within the fluid passage and has an outer block surface extending circumferentially and abutting against a portion of the inner gland surface, and an inner block surface extending circumferentially and opposite to the outer block surface. The outer block surface has two circumferentially opposite outer ends. The inner block surface has two circumferentially opposite inner ends. The guide block further has two opposite end faces each of which connects one of the outer ends to one of the inner ends. The inner ends subtend an angle of not larger than 90° at a center line of the gland. At least one of the end faces lies in a plane line that is substantially tangent to an outer peripheral face of the ring. The fixing member is connected to the guide block and is fixed to the gland.

In a second aspect of this invention, a seal device for a rotary shaft includes a sleeve, at least one gland, a guide block, a fixing member, and a welding material. The sleeve is for extension of and connection with the rotary shaft. The gland has inner and outer gland surfaces, and a fixing hole that is stepped to form small and large cross-section portions extending radially and respectively through the inner and outer gland surfaces. The inner gland surface defines a central hole for extension of the sleeve, and a fluid passage extending annularly around the central hole. The guide block is disposed within the fluid passage and has an outer block surface extending circumferentially and abutting against a portion of the inner gland surface, and an inner block surface extending circumferentially and opposite to the outer block surface. The fixing member is connected to the guide block and extends through the small and large cross-section portions. The fixing member is received fittingly in the small cross-section portion. The welding material fills the large cross-section portion around the fixing member, thereby retaining the fixing member in the fixing hole.

In a third aspect of this invention, there is provided a method for fixing a guide block in a gland of a seal device for a stuffing box, in which the gland has an inner gland surface that defines a central hole and a fluid passage extending annularly around the central hole, and an outer gland surface surrounding the inner gland surface. The method includes the steps of: providing the gland with a fixing hole that extends radially through the inner and outer gland surfaces; disposing the guide block in the fluid passage; inserting a fixing member into the fixing hole; connecting the fixing member to the guide block; placing an outer block surface of the guide block in abutment with the inner gland surface; filling a welding material in the fixing hole around the fixing member, thereby retaining the fixing member in the fixing hole; and cutting a portion of the fixing member that extends outwardly of the fixing hole, followed by a grinding process to make the fixing member flush with the outer gland surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
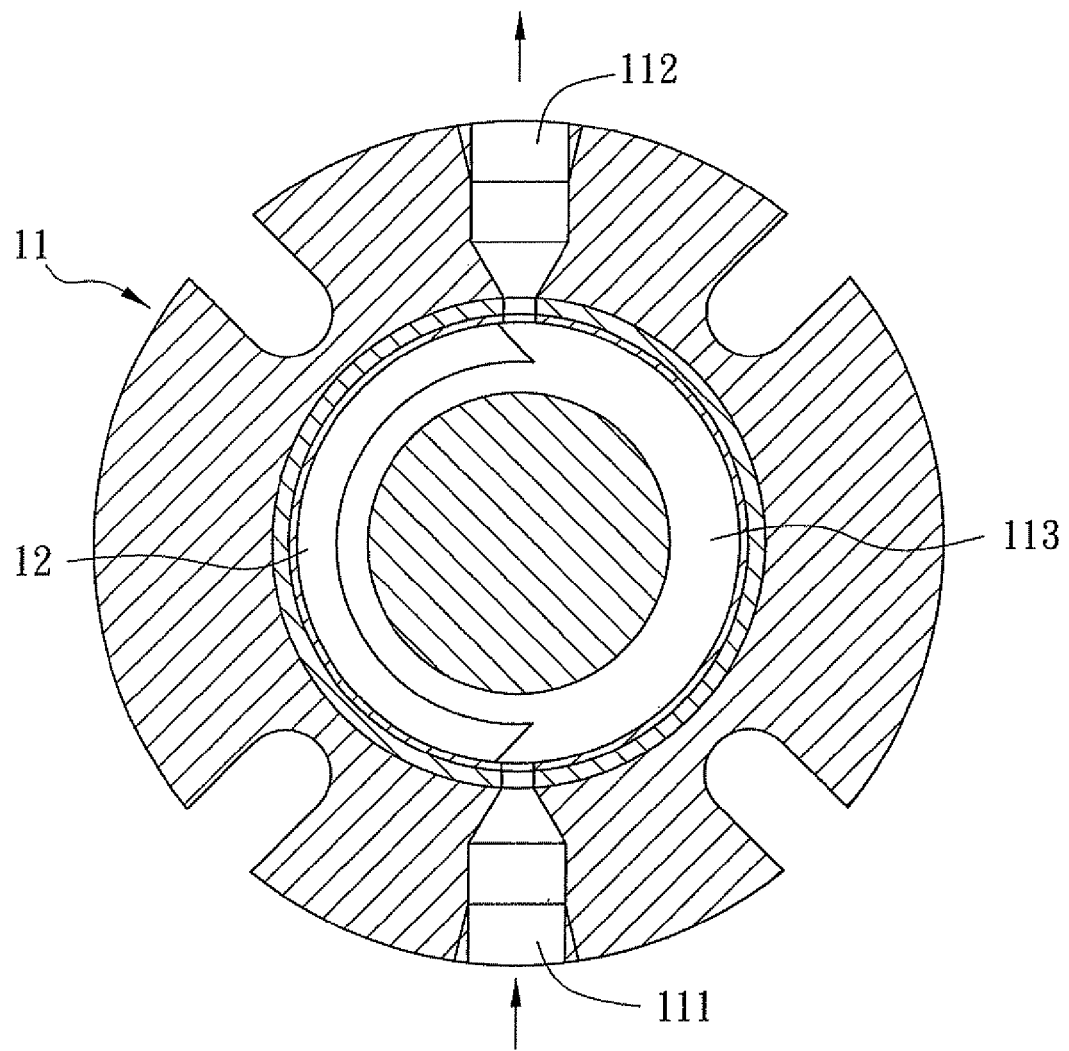
FIG. 1 is a sectional view of a conventional seal device.
Figure 2:
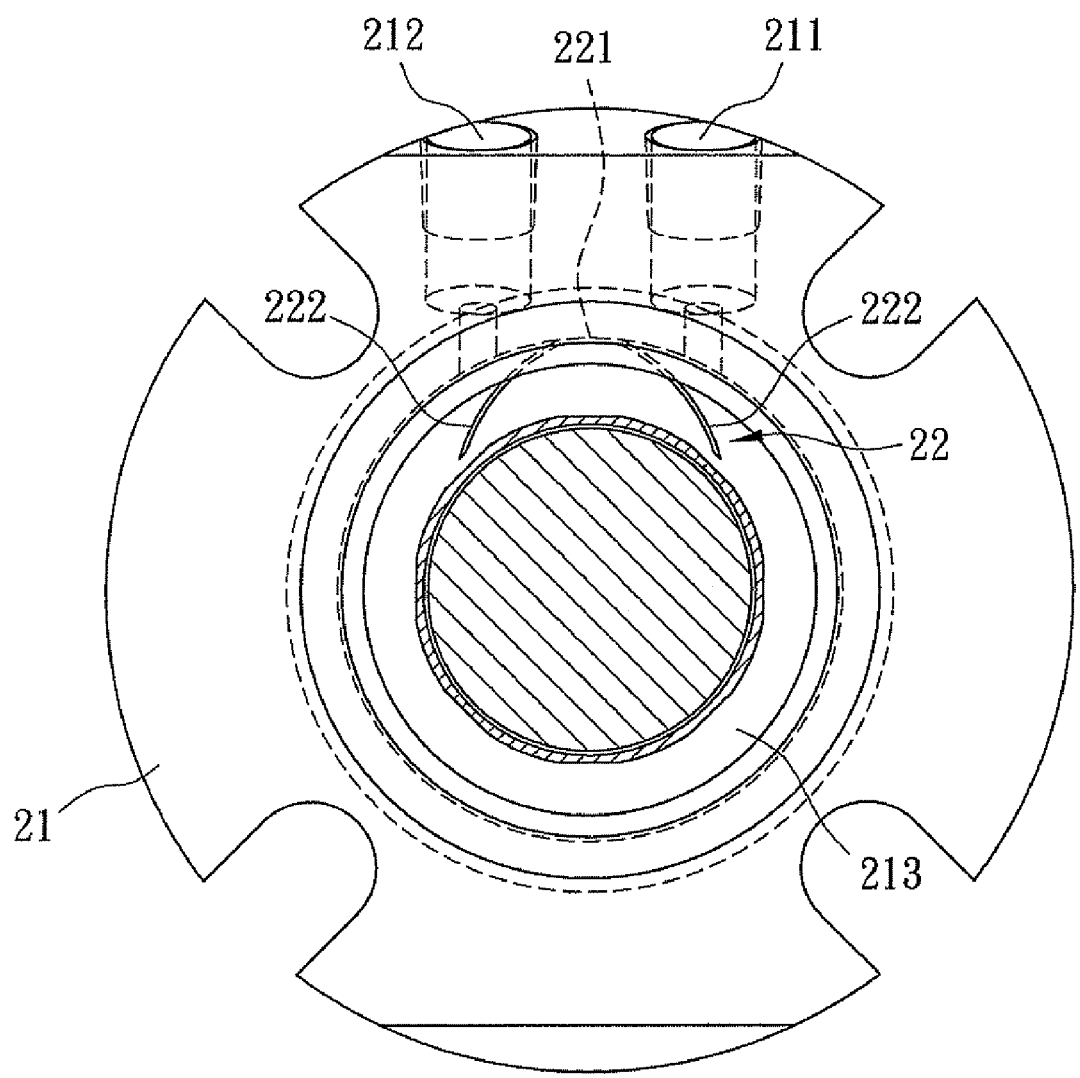
FIG. 2 is a schematic view of another conventional seal device.
Figure 3:
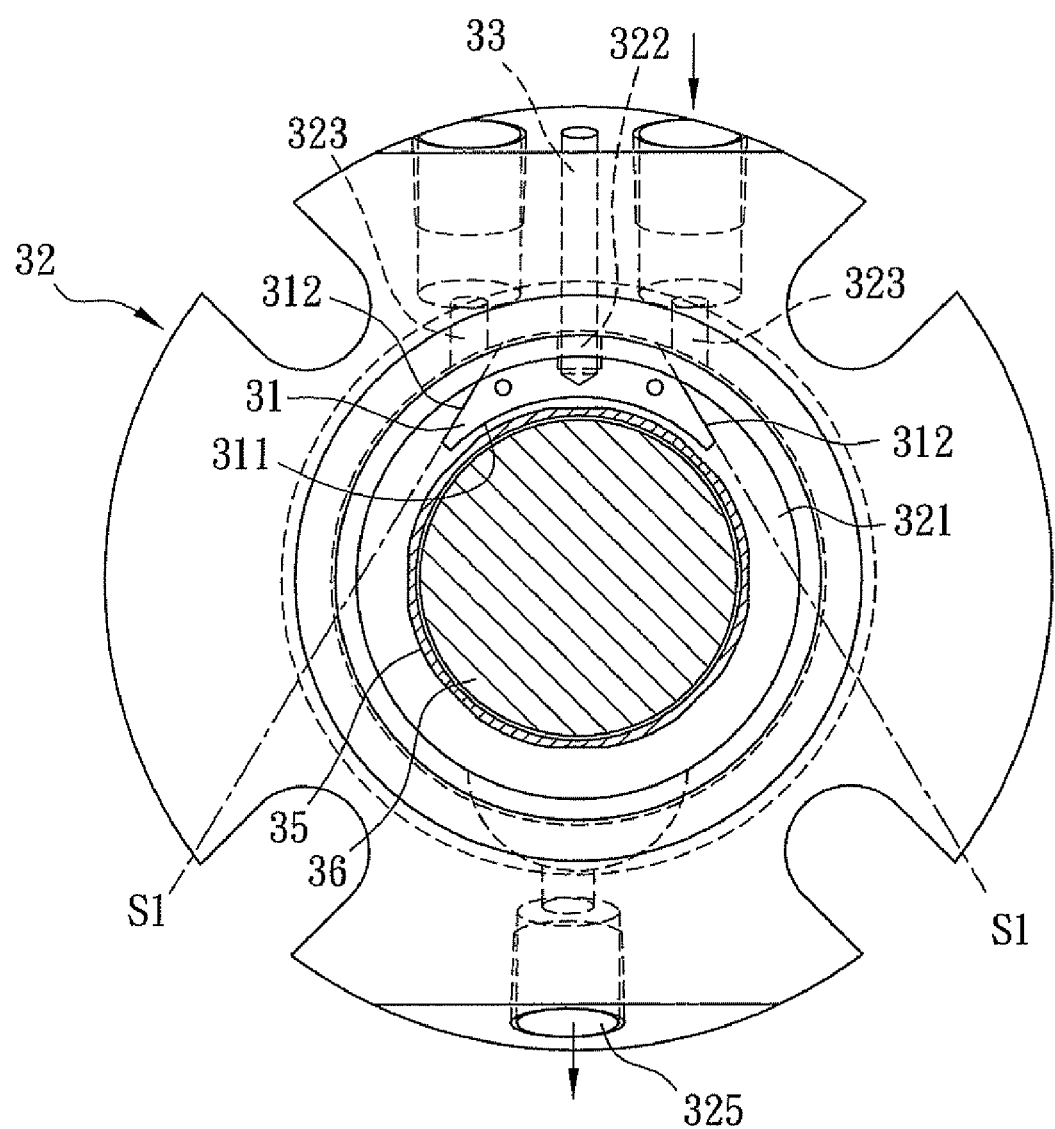
FIG. 3 is a schematic view of still another conventional seal device.
Figure 4:
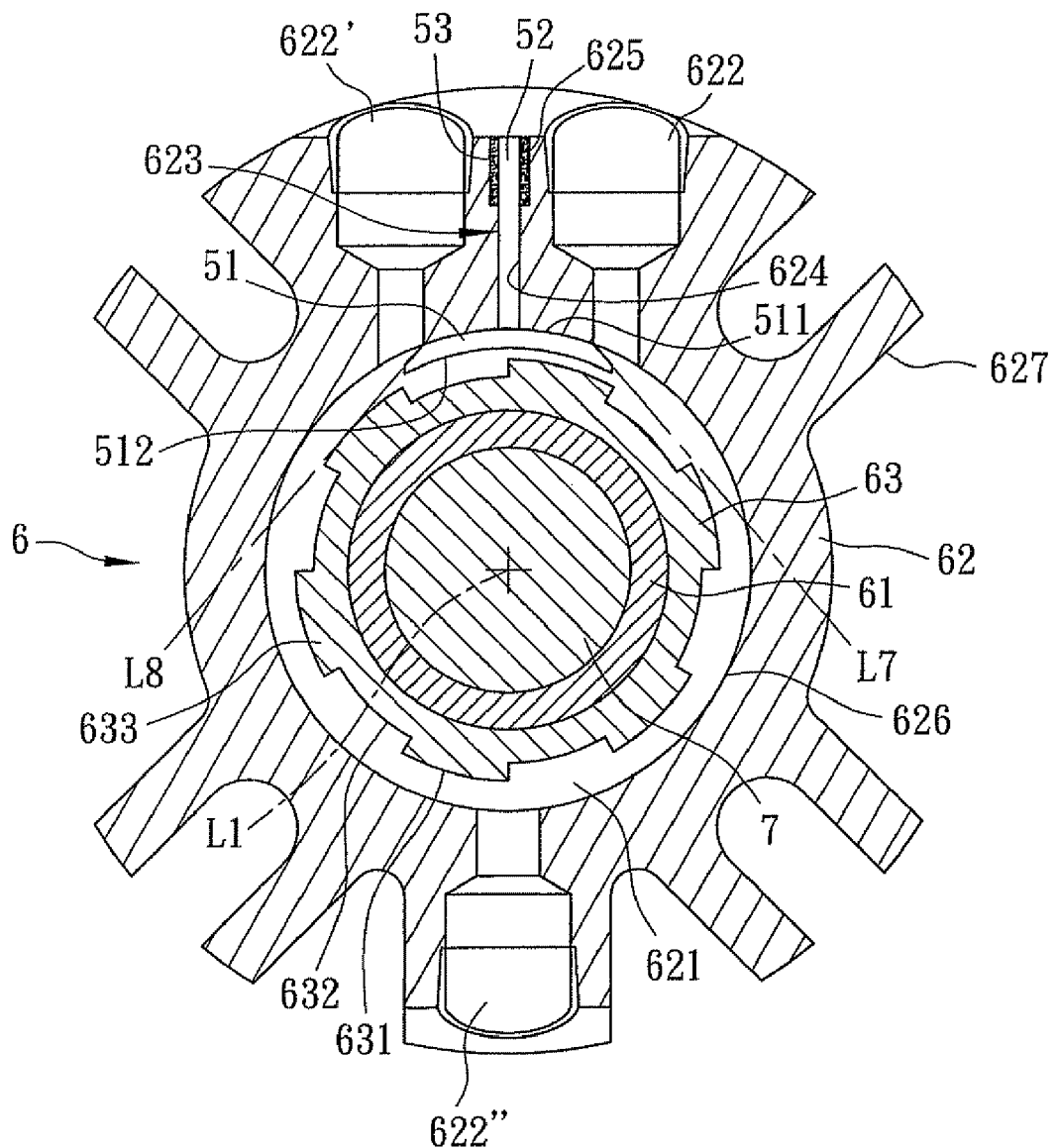
FIG. 4 is a sectional view of a preferred embodiment of a seal device according to this invention.
Figure 5:
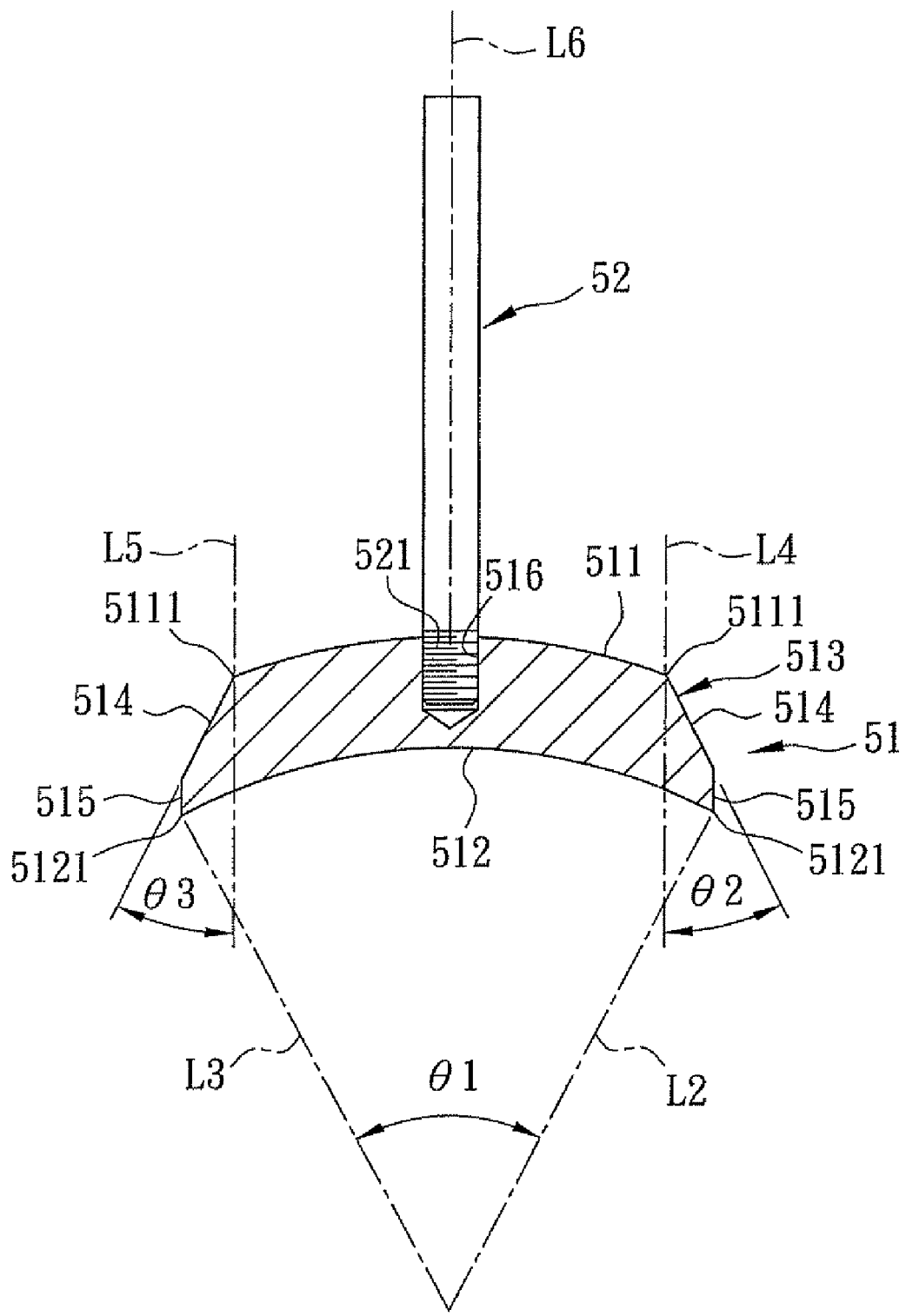
FIG. 5 is a sectional view of a guide block and a fixing member used in the preferred embodiment.

Referring to FIGS. 4 and 5, the preferred embodiment of a seal device 6 according to this invention is mounted between a stuffing box and a rotary shaft 7 of a mixing machine (not shown), and includes a sleeve 61, a gland 62, a rotary ring 63, a guide block 51, a fixing member 52, and a welding material 53.

The sleeve 61 is for extension of and connection with the rotary shaft 7.

The gland 62 has an inner gland surface 626, an outer gland surface 627 extending around the inner gland surface 626, and a fixing hole 623 that is stepped to form small and large cross-section portions 624, 625 extending radially and respectively through the inner and outer gland surfaces 626, 627. The inner gland surface 626 defines a central hole for extension of the sleeve 61, and a fluid passage 621 extending annularly around the central hole. The gland 62 is further formed with a first hole 622, a second hole 622', and a third hole 622", which are fluidly communicated with the fluid passage 621. The first and second holes 622, 622' are proximate to the guide block 51, and the third hole 622" is opposite to the guide block 51.

The rotary ring 63 is disposed around the sleeve 61 within the central hole. The rotary ring 63 has an outer peripheral face 631 formed with a plurality of annularly spaced apart recesses 632 and projections 633.

It should be noted that two or more glands 62 can be used in series, and that the number of the rotary ring 63 may be one or more.

The guide block 51 is disposed within the fluid passage 621 and has an outer block surface 511 extending circumferentially and abutting against a portion of the inner gland surface 626, and an inner block surface 512 extending circumferentially and opposite to the outer block surface 511. The outer block surface 511 has two circumferentially opposite outer ends 5111. The inner block surface 512 has two circumferentially opposite inner ends 5121. The guide block 51 further has two opposite end faces 513 each of which connects one of the outer ends 5111 to one of the inner ends 5121. The inner ends 5121 subtend an angle ($\theta 1$), which is defined by two lines (L2, L3) passing through a center line (L1) of the gland 62, of not larger than 90° at the center line (L1) of the gland 62. The end faces 513 respectively lie in plane lines (L7, L8) that are substantially tangent to an outer peripheral face of the rotary ring 63. Specifically, each of the end faces 513 has an inclined face 514 lying in a corresponding one of the plane lines (L7, L8) and adjoining a corresponding one of the outer ends 5111 of the outer block surface 511, and a cut face 515 extending from the inclined face 514 to a corresponding one of the inner ends 5121 of the inner block surface 512.

The fixing member 52 is connected to the guide block 51 and is fixed to the gland 62. The fixing member 52 extends along a radial line (L6) that passes through the center line (L1) of the gland 62. In this embodiment, the fixing member 52 is a fixing rod that has an external thread 521, and the guide block 51 has a threaded hole 516 extending inwardly from the outer block surface 511. The fixing rod is engaged in the threaded hole 516. Alternatively, the fixing member 52 and the guide block 51 can be formed as one piece. The fixing member 52 extends through the small and large cross-section portions 624, 625 and is received fittingly in the small cross-section portion 624. The large cross-section portion 625 is filled with the welding material 53 therein around the fixing member 52 so as to retain the fixing member 52.

Specifically referring to FIG. 5, both of the end faces 513 have the inclined faces 514 extending from the outer ends 5111 of the outer block surface 511 along diverging directions that are inclined with respect to the radial line (L6) of the fixing member 52. Furthermore, both of the end faces 513 have the cut faces 515 extending respectively from the inclined faces 514 to the inner ends 5121 of the inner block surface 512 along directions which are substantially parallel to the radial line (L6) of the fixing member 52. Each of the inclined faces 514 forms an angle ($\theta 2$, $\theta 3$) ranging from 10° to 80° with a line (L4, L5) which is parallel to the radial line (L6) of the fixing member 52 and which passes through the adjoining one of the outer ends 5111 of the outer block surface 511.

Figure 6:
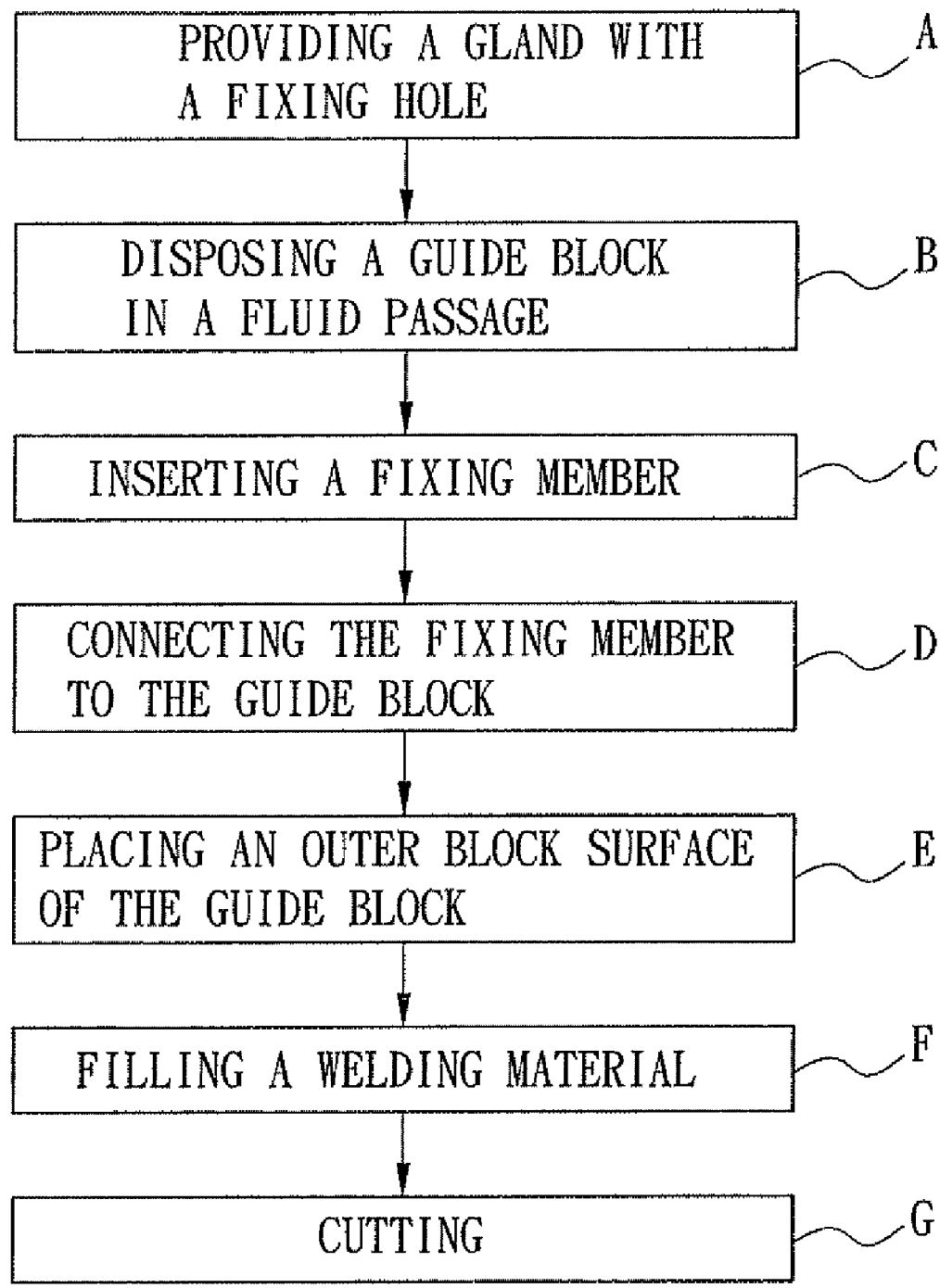
FIG. 6 is a flow chart of a preferred embodiment of a method for fixing a guide block in a gland of a seal device according to this invention.
Figure 7:
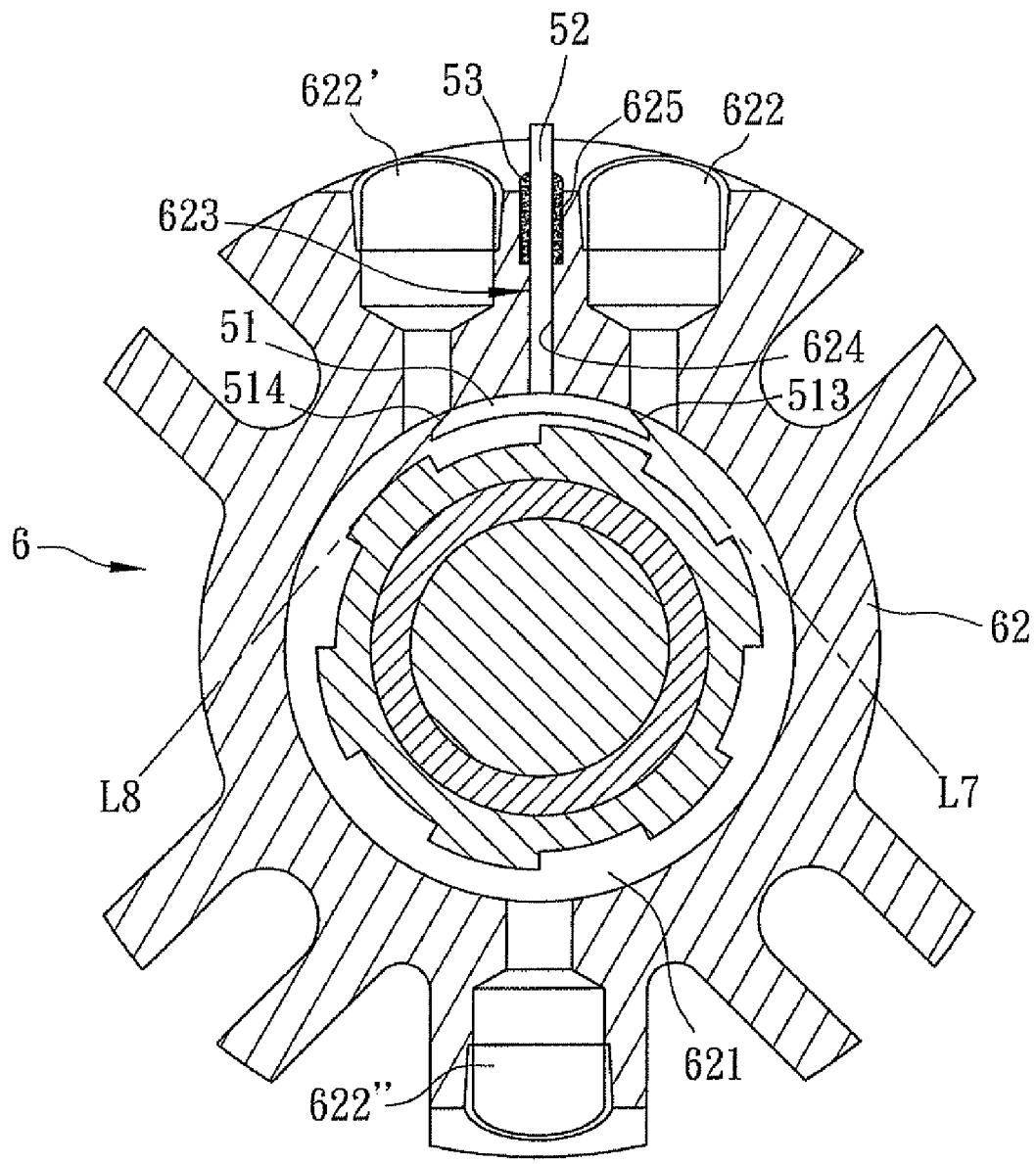
FIG. 7 is a sectional view of a semi-product made by the preferred embodiment of FIG. 6.

Referring to FIGS. 4, 6, and 7, a preferred embodiment of a method for fixing the guide block 51 in the gland 62 of the seal device 6 for the stuffing box according to this invention includes the steps of:

A) providing the gland 62 with the fixing hole 623:

The gland 62 is provided with the fixing hole 623 that extends radially through the inner and outer gland surfaces 626, 627 of the gland 62. The fixing hole 623 is stepped to form small and large cross-section portions 624, 625. The small cross-section portion 624 extends through the inner gland surface 626 to communicate with the fluid passage 621. The large cross-section portion 625 extends through the outer gland surface 627.

B) disposing the guide block 51 in the fluid passage 621:

The guide block 51 is disposed in the fluid passage 621.

C) inserting the fixing member 52:

The fixing member 52 is inserted into the fixing hole 623 from the outer gland surface 627.

D) connecting the fixing member 52 to the guide block 51:

The fixing member 52 is connected to the guide block 51 by screwing.

Alternatively, the fixing member 52 can be connected to the guide block 51, for example, by screwing before being inserted into the fixing hole 623, and is inserted into the fixing hole 623 from the inner gland surface 626 after the guide block 51 is disposed in the fluid passage 621. This is especially performed in the case in which the fixing member 52 and the guide block 51 are formed as one piece.

E) placing the outer block surface 511 of the guide block 51 in abutment with the gland 62:

The outer block surface 511 of the guide block 51 is placed in abutment with the inner gland surface 626 of the gland 62.

F) filling the welding material 53:

The welding material 53 is filled in the large cross-section portion 625 of the fixing hole 623 around the fixing member 52, thereby retaining the fixing member 52 in the fixing hole 623.

G) cutting:

A portion of the fixing member 52 that extends outwardly of the fixing hole 623 is cut, followed by a grinding process to make the fixing member 52 flush with the outer gland surface 627 of the gland 62.

Referring again to FIG. 4, in the preferred embodiment in which the seal device 6 is used as a dual seal device, two of the holes 622, 622', 622" are respectively used as an inlet and an outlet for the buffer/barrier fluid. The remaining one of the holes 622, 622', 622" is plugged.

Figure 8:
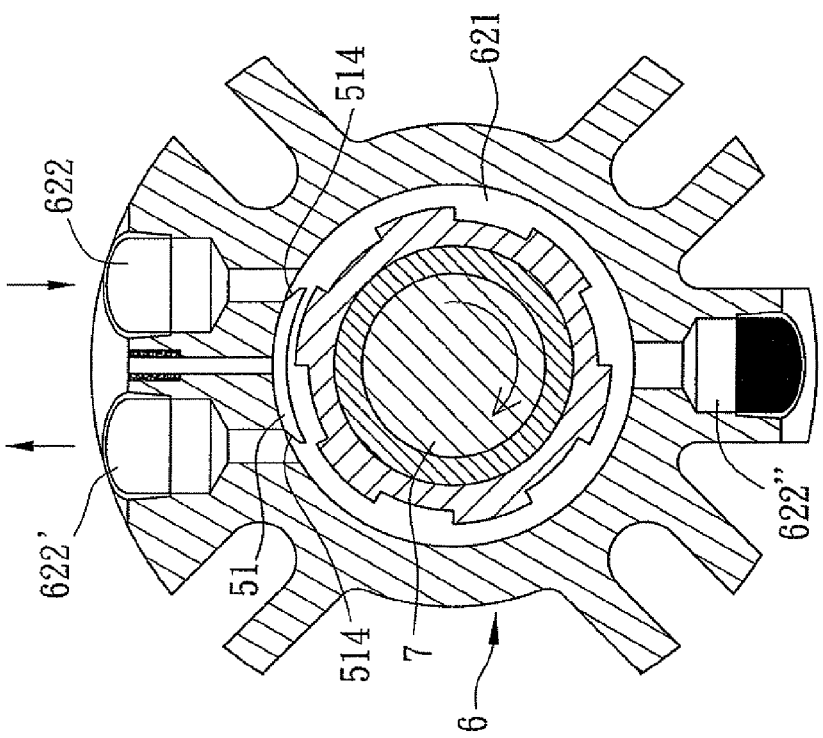

Referring to FIG. 8, when the rotary shaft 7 is rotated clockwise, the third hole 622" is plugged, and the first and second holes 622, 622' are respectively used as the inlet and the outlet for the buffer/barrier fluid. As indicated by the arrows in the figure, the buffer/barrier fluid flows through the first hole 622, is guided by the inclined face 514 of a corresponding one of the end faces 513 of the guide block 51, flows smoothly in the fluid passage 621, and exits through the second hole 622'. Conversely, when the rotary shaft 7 is rotated counterclockwise, the buffer/barrier fluid flows through the second hole 622', is guided by the inclined face 514 of a corresponding one of the end faces 513 of the guide block 51, flows smoothly in the fluid passage 621, and exits through the first hole 622.

Figure 9:
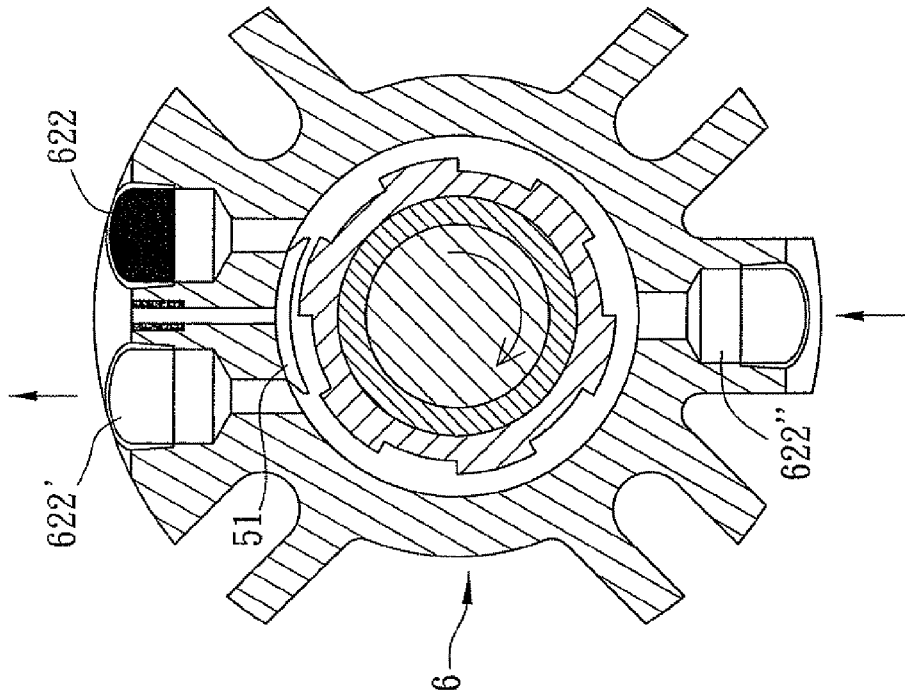
FIGS. 8 to 11 are sectional views illustrating various practice states of the preferred embodiment of FIG. 4.

Referring to FIG. 9, when the rotary shaft 7 is rotated clockwise, the first hole 622 is plugged, the second hole 622' is used as the outlet for the buffer/barrier fluid, and the third holes 622" is used as the inlet for the buffer/barrier fluid. Conversely, when the rotary shaft 7 is rotated counterclockwise, the second hole 622' is plugged, the first hole 622 is used as the outlet for the buffer/barrier fluid, and the third holes 622" is used as the inlet for the buffer/barrier fluid.

Figure 10:
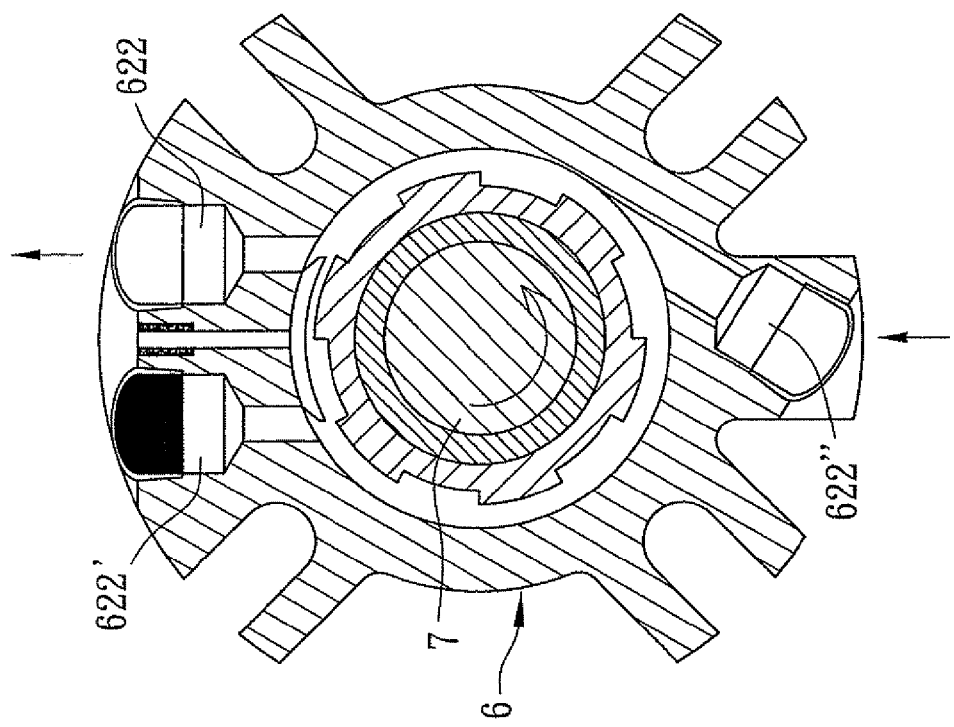

Referring to FIG. 10, when the rotary shaft 7 is rotated counterclockwise, the second hole 622' is plugged, the first hole 622 is used as the outlet for the buffer/barrier fluid, and the third hole 622" is inclined relative to the first and second holes 622, 622' and is used as the inlet for the buffer/barrier fluid. Conversely, when the rotary shaft 7 is rotated clockwise, the first hole 622 is plugged, the second hole 622 is used as the outlet for the buffer/barrier fluid, and the third hole 622" is inclined in an opposite direction relative to the first and second holes 622, 622' and is used as the inlet for the buffer/barrier fluid.

Figure 11:
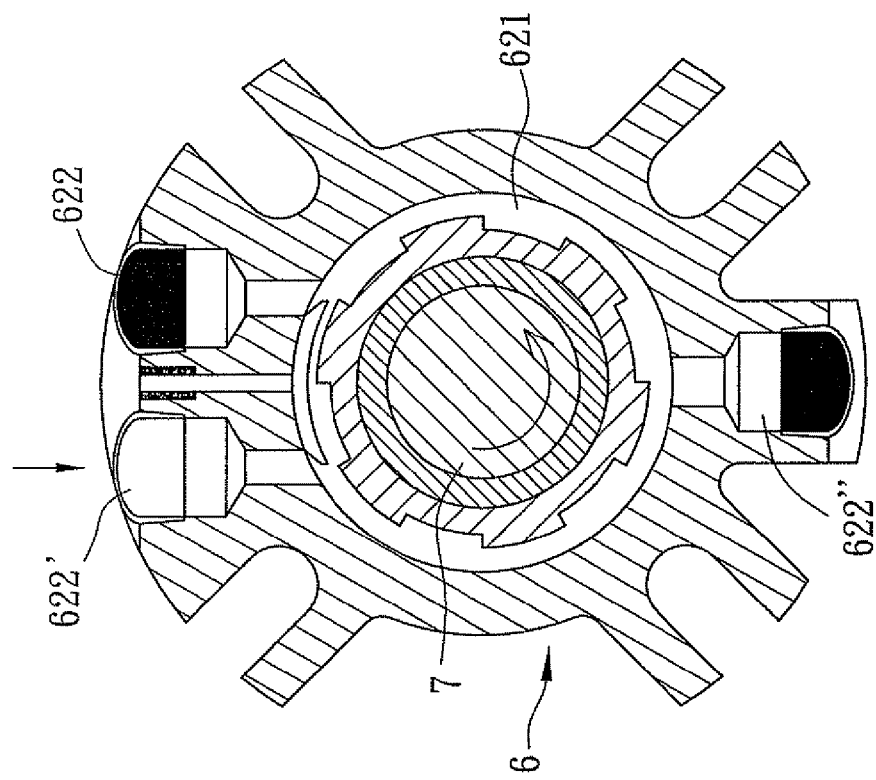

Referring to FIG. 11, when the seal device 6 is used as a single seal device and the rotary shaft 7 is rotated counterclockwise, the first and third holes 622, 622" are plugged. In this case, the flush fluid is passed through the second hole 622' and is supplied into the fluid passage intermittently. Conversely, when the rotary shaft 7 is rotated clockwise, the second and third holes 622', 622" are plugged. In this case, the flush fluid is passed through the first hole 622 and is supplied into the fluid passage intermittently.

Figure 12:
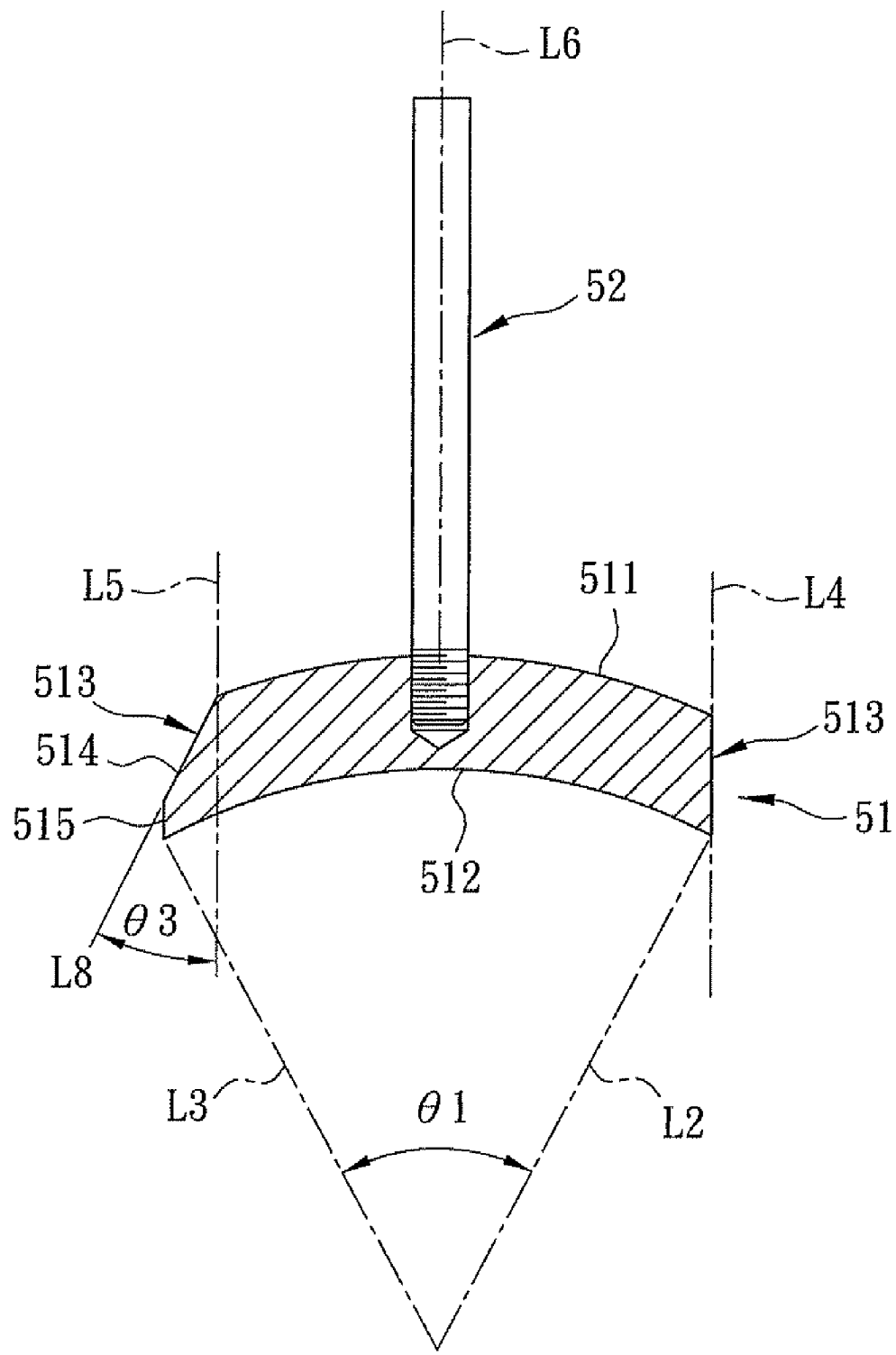
FIG. 12 is a sectional view of another example of the guide block connected to the fixing member.

Referring to FIG. 12, another configuration of the guide block 51 suitable for the seal device 6 of this invention is illustrated, in which only one of the end faces 513 of the guide block 51 has the inclined face 514 lying in a plane line (L8) that is substantially tangent to an outer peripheral face of the rotary ring 63, and in which the other of the end faces 513 of the guide block 51 lies in the line (L4) parallel to the radial line (L6). The configuration of the guide block 51 shown in FIG. 12 is especially suitable for the seal device 6 in the situations shown in FIGS. 9, 10, and 11.

Figure 13:
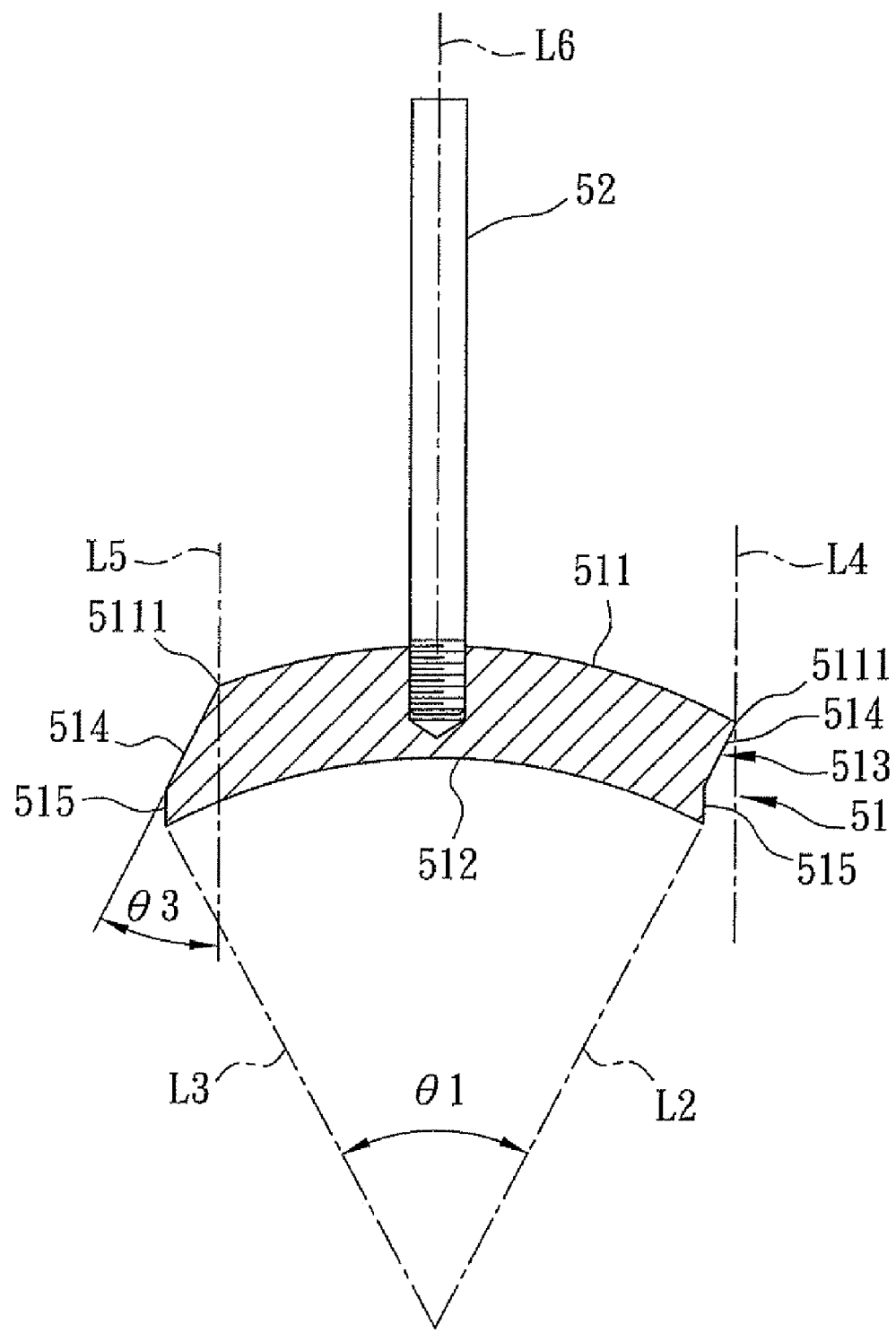
FIG. 13 is a sectional view of still another example of the guide block connected to the fixing member.

Referring to FIG. 13, still another configuration of the guide block 51 suitable for the seal device 6 of this invention is illustrated, in which both of the end faces 513 of the guide block 41 have the inclined faces 514 extending from the outer ends 5111 of the outer block surface 511 along parallel directions which are inclined with respect to the radial line (L6) of the fixing member 52. The configuration of the guide block 51 shown in FIG. 13 is especially suitable for the seal device 6 in the situations shown in FIGS. 9, 10, and 11.

In view of the aforesaid, since at least one of the end faces 513 of the guide block 51 has the inclined face 514 lying in the plane line (L7, L8) that is substantially tangent to the outer peripheral face of the rotary ring 63, the buffer/barrier fluid or the flush fluid can be guided by the inclined face 514 of the guide block 51 so as to flow smoothly in the fluid passage 621. Furthermore, since the welding material 53 fills the large cross-section portion 625 of the fixing hole 623 around the fixing member 52, the fixing member 52 can be retained in the fixing hole 623 and is not easily broken.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for fixing a guide block in a gland of a seal device for a rotary shaft, the gland having an inner gland surface that defines a central hole and a fluid passage extending annularly around the central hole, and an outer gland surface surrounding the inner gland surface, the method comprising the steps of:

providing the gland with a fixing hole that extends radially through the inner and outer gland surfaces;

disposing the guide block in the fluid passage;

inserting a fixing member into the fixing hole;

connecting the fixing member to the guide block;

placing an outer block surface of the guide block in abutment with the inner gland surface;

filling a welding material in the fixing hole around the fixing member, thereby retaining the fixing member in the fixing hole; and cutting a portion of the fixing member that extends outwardly of the fixing hole, followed by a grinding process to make the fixing member flush with the outer gland surface.

2. The method as claimed in claim 1, wherein the fixing hole is stepped to form small and large cross-section portions, the small cross-section portion extending through the inner gland surface to communicate with the fluid passage, the large cross-section portion extending through the outer gland surface, the welding material being filled in the large cross-section portion.

3. The method as claimed in claim 1, wherein the fixing member is connected to the guide block before being inserted into the fixing hole, and is inserted into the fixing hole from the inner gland surface after the guide block is disposed in the fluid passage.

4. The method as claimed in claim 3, wherein the fixing member and the guide block are formed as one piece.

5. The method as claimed in claim 1, wherein the fixing member is inserted into the fixing hole from the outer gland surface and is thereafter connected to the guide block disposed in the fluid passage.

6. The method as claimed in claim 3, wherein the fixing member is screwed to the guide block.

7. The method as claimed in claim 5, wherein the fixing member is screwed to the guide block.

8. The method as claimed in claim 1, wherein the guide block has two opposite end faces having inclined faces extending from two circumferentially opposite outer ends of the outer block surface of the guide block along parallel directions which are inclined with respect to a radial line of the fixing member.

9. The method as claimed in claim 1, wherein the guide block has two opposite end faces, at least one of the end faces of the guide block having an inclined face and a cut face extending from the inclined face to one of two circumferentially opposite inner ends of an inner block surface of the guide block.

* * * * *